March 4, 1969
L. C. BATE ET AL
3,431,414
RADIATION DETECTOR AND RECORDER
Filed July 11, 1967
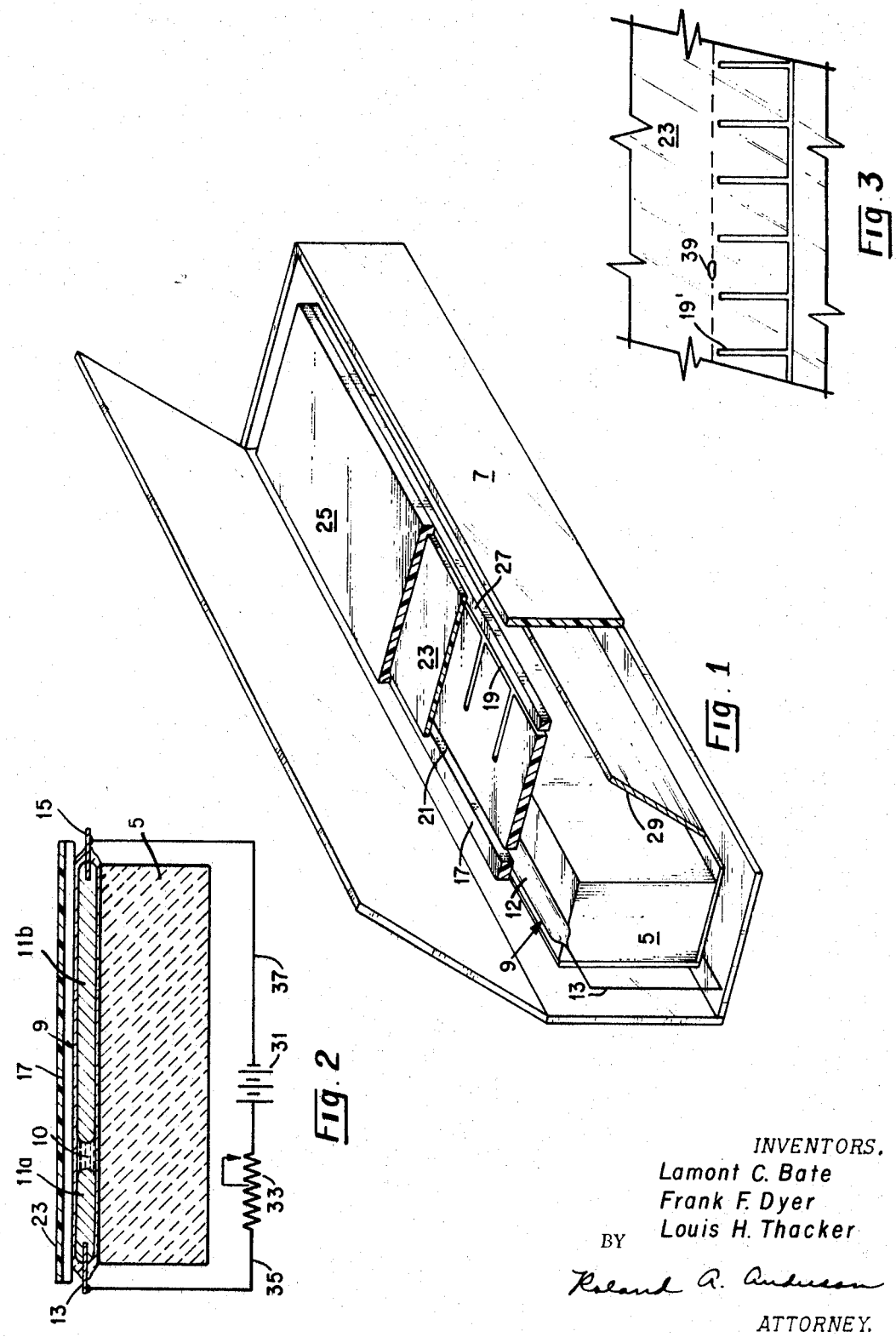
INVENTORS.
Lamont C. Bate
Frank F. Dyer
Louis H. Thacker
BY Roland A. Anderson
ATTORNEY.

United States Patent Office 3,431,414
Patented Mar. 4, 1969

3,431,414
RADIATION DETECTOR AND RECORDER
Lamont C. Bate, Clinton, and Frank F. Dyer and Louis H. Thacker, Knoxville, Tenn., assignors to the United States of America as represented by the United States Atomic Energy Commission
Filed July 11, 1967, Ser. No. 652,632
U.S. Cl. 250—71.5                     3 Claims
Int. Cl. G01t 1/20

ABSTRACT OF THE DISCLOSURE

A "sentinel-type" radiation detector is provided which is quite useful in detecting and recording the occurrence of pulses of radiation together with information indicating the time of the occurrence. A microcoulometer is employed in conjunction with a scintillator for indicating time of radiation occurrence. Light from the scintillator passing through the aperture of the coulometer and a scaled mask is recorded on photographic film.

Background of the invention

This invention was made in the course of, or under, a contract with the U.S. Atomic Energy Commission.

This invention relates to "sentinel-type" radiation detectors for recording the occurrence of pulses of ionizing radiation, and more specifically to a compact "sentinel-type" radiation detector for detecting and recording information as to the time of the occurrence of the pulse of radiation.

There are many instances where a "sentinel-type" radiation detector is useful to record the occurrence of pulses of radiation. These include the monitoring of dangerous radiation in nuclear fuel processing areas, around nuclear reactors, high voltage accelerators and the like. The specific radiation may be X-rays, $\gamma$-rays, neutrons, or even energetic $\beta$ particles. There are in existence many devices, especially of the scintillation type, which provide adequate information for such installations, but there are none known which provide accurate information as to the time of the occurrence of the pulse of radiation.

Summary of the invention

The detector of this invention provides not only for radiation detection, but provides means for recording the time of the occurrence of the pulse along with the recording of the intensity of the pulse of radiation. The device is relatively compact and inexpensive. It is battery powered and is capable of detecting and recording pulses of submicrosecond duration.

This device comprises a light-tight enclosure with a scintillator disposed therein which converts impinging radiation pulses to visible light pulses, similar to the scintillator used in U.S. Patent No. 3,119,016, issued Jan. 21, 1964, to F. H. Attix. A photographic recording means is provided for recording the light pulses from the scintillator. A means is provided for linearly moving an aperture between the scintillator and the photographic recording means so that light pulses from the scintillator pass through said aperture on to the photographic recording means. A mask having a transparent scale is disposed in juxtaposition to said photographic recording means for allowing light to pass from said scintillator to said photographic recording means.

Accordingly, it is an object of this invention to provide a compact radiation detector for detecting and recording the occurrence of pulses of radiation together with information as to the time of the occurrence.

Other objects and many of the attendant advantages of the present invention will become evident from the following description when taken in conjunction with the accompanying drawings, wherein like reference numerals indicate similar items throughout the figures.

Brief description of the drawings

FIG. 1 is a pictorial view, partially cut away, of a detector according to the present invention;

FIG. 2 is a schematic diagram of the detector of FIG. 1 with the housing removed; and FIG. 3 is a drawing illustrating the form of the information obtained with the subject detector.

Description of the preferred embodiment

Referring now to FIG. 1, reference numeral 5 designates a scintillator which is disposed in a radiation-pervious, light-tight enclosure 7. A microcoulometer 9, consisting of a transparent capillary tube 12, the interior of which, except for a small volume of transparent electrolyte forming a light aperture 10 (see FIG. 2), is filled with a mercury column 11 and positioned along one surface of the scintillator 5. Each end of the mercury column of the microcoulometer 9 is connected to a battery through electrodes 13 and 15 (see FIG. 2) the purpose of which will be explained later. A mask 17 having a transparent time indicating scale 19 therein extending the length of the microcoulometer 9 is disposed against the opposite side of the microcoulometer 9. This mask 17 also has a transparent slot 21 which is aligned with the microcoulometer 9. A photographic film 23 is positioned against the mask 17 on the face opposite from the microcoulometer 9, and is held in place by an opaque plate 25 disposed over the film 23. Plate 25 may be hinged to mask 17 or rigidly mounted as shown in the drawing with a slot portion 27 into which the film 23 is slipped into position on the mask and removed after an exposure cycle which will be explained later. A reflector 29 may be included within the enclosure 7 to aid in focusing light from the scintillator 5 through the transparent scale 19 onto the film 23. Although not shown, opaque material (e.g., plastic) is used to fill the crevice between the microcoulometer 9 and the mask 17 to limit light passing through the slot 21 to that passing through the aperture 10 of the microcoulometer 9.

Referring now to FIG. 2, a schematic diagram of particularly the microcoulometer of FIG. 1 is shown. As referred to above, the mercury column has an aperture or gap 10 which divides the mercury column into two components 11a and 11b. This gap 10 is filled with an appropriate transparent electrolyte, such as mercuric nitrate. Electrodes 13 and 15 are inserted into opposite ends of the microcoulometer 9, into electrical connection with the mercury column 11, and sealed therein. A D.C. voltage source 31, connected in series with a variable resistor 33, is connected between electrodes 13 and 15 by means of electrical leads 35 and 37 connecting respectively electrode 13 to resistors 33 and electrode 15 to source 31.

The principle of operation of a microcoulometer, which is known in the art, involves the transport of mercury from one portion 11a of the column to the other portion 11b through the electrolyte when current passes through the unit, or transporting 11b to 11a, depending upon the direction of current flow. This effectively moves the aperture 10 containing the electrolyte along the capillary. The rate of movement is controlled by the value of the current, with larger currents giving faster movement of the aperture 10. With a current of a few tenths of microamperes, the aperture will travel only about one quarter of an inch per day. Total travel could be adjusted to vary from several hours to several months if desired.

In a normal operation of the subject detector, the movement of the aperture 10 (after being calibrated) is effected by the current flowing through the microcoulometer 9 from source 31. When a burst of radiation strikes the scintillator 5, light is emitted therefrom in all directions. Some of this light is reflected from the interior of the enclosure 7, or from the reflector 29, and passes through the transparent scale 19 of mask 17 so as to expose the film 23 to the time indicating scale of the mask. Also, light will pass through the aperture 10 containing the transparent electrolyte and the slot 21 of mask 17 to produce a spot upon the film near the time scale and at a position therealong relative to the time elapsing from the initiation of the travel of the aperture 10. This results in a photographic record as illustrated in FIG. 3. This will be the image of the scale 19', with suitable indicia, (e.g., minutes, hours, days, etc.) and the record of the position of the aperture 10 as a spot 39 along this scale. There may be, of course, several radiation bursts separated by various time intervals and each will be recorded. Furthermore, the sharpness of the image of the spot 39 will provide qualitative information as to the duration of the pulse of radiation. The plate 25 holds the film 23 firmly against the mask 17 for sharp lenless focus.

EXAMPLE

A detector in accordance with the embodiment as described herein was constructed using a thalium activated cesium iodide [CsI(T1)] scinillator and a microcoulometer, fabricated from glass capillary, purchased from Curtis Instruments, of Mount Kisco, N.Y. The microcoulometer is approximately 4½ inches long with an I.D. of 0.012 inch and an O.D. of 0.025 inch. The aperture 10 containing the electrolyte in the mercury column is 0.010 inch long. The voltage source 31 is a 1.4 v. mercury cell, and the resistor 33 is a 50K ohm variable resistor adjusted to provide a current flow of about 58µ amps. At this current the microcoulometer time interval was 16 days and radiation doses as small as 0.1 milliroentgen were recorded on the film.

Although a preferred embodiment has been shown and described herein, obviously many modifications may be made, especially with regard to the scintillator. For example, the scintillator for the unit is chosen to respond to the particular radiation to be expected, e.g., LiF:Eu for neutrons, NaI (T1) or CsI (T1) for X- or γ-rays, etc. When the device is used to measure radiation in excess of some set value, filters may be used either exterior to the scintillator or on the face of the film to aid in proper recording and prevent over exposure of the film.

Thus, it will be seen that a compact "sentinel-type" detector has been provided which is especially useful in detecting and recording the occurrence of pulses of radiation together with information indicating the time of the occurrence on an appropriately indicated scale.

In view of the above and numerous other equally possible arrangements, the scope of the invention should be considered limited only by the following claims.

We claim:
1. A radiation detector for detecting and recording pulses of ionizing radiation along with an indication as to the time of the occurrence of said pulses, comprising: a radiation-previous light-tight enclosure; a scintillator disposed within said enclosure for converting impinging pulses of radiation to visible light pulses; photographic recording means secured within said enclosure over said scintillator for recording said light pulses; means for providing a linearly moveable aperture between said scintillator and said photographic recording means; a mask disposed in juxtaposition to said photographic recording means and adjacent to said scintillator, said mask having a transparent scale therein, whereby light from said scintillator passing through said aperture and said transparent scale of said mask is recorded on said photographic recording means, wherein said means for providing a linearly moveable aperture is a coulometer connected in an electrical circuit, said coulometer including an elongated glass tube, a first column of mercury, a second column of mercury, said first and second columns of mercury being spaced apart by a transparent electrolyte forming said aperture, said electrical circuit including a voltage source, and a resistor connected in series with said voltage source for varying the current through said coulometer thereby varying the timing interval of said coulometer, wherein said scaled mask extends over said coulometer, said mask having a transparent slot therein adjacent said tube of said coulometer, whereby light from said scintillator passing through said aperture of said coulometer and said slot of said mask exposes a spot on said photographic recording means.

2. A radiation detector as set forth in claim 1 wherein said photographic recording means includes a strip of photographic film disposed on said mask and aligned with said slot and said scale of said mask and an opaque plate disposed over said film so that said film is exposed only through said slot and said scale of said mask.

3. A radiation detector as set forth in claim 2 further including a reflector secured within said light-tight enclosure for reflecting light from said scintillator through said transparent scale of said mask.

References Cited
UNITED STATES PATENTS

| | | | |
|---|---|---|---|
| 2,585,551 | 2/1952 | Hofstadter | 250—83 |
| 3,119,016 | 1/1964 | Attix | 250—71.5 |
| 3,380,072 | 4/1968 | Groothius | 346—107 |

RALPH G. NILSON, *Primary Examiner.*

MORTON J. FROME, *Assistant Examiner.*

U.S. Cl. X.R.

250—83; 324—68, 94; 346—107